US009042505B2

(12) United States Patent
Lin et al.

(10) Patent No.: US 9,042,505 B2
(45) Date of Patent: May 26, 2015

(54) DATA TRANSMISSION APPARATUS HAVING FREQUENCY SYNTHESIZER WITH INTEGER DIVISION FACTOR, CORRESPONDING METHOD, AND DATA TRANSMISSION SYSTEM

(71) Applicant: MEDIATEK INC., Hsin-Chu (TW)

(72) Inventors: Chi-Feng Lin, Hsinchu (TW);
Kung-Yen Hsu, Pingtung County (TW);
Yu-Bang Nian, Changhua County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/065,436

(22) Filed: Oct. 29, 2013

(65) Prior Publication Data

US 2015/0121120 A1    Apr. 30, 2015

(51) Int. Cl.
*H04L 7/00* (2006.01)
*G06F 1/08* (2006.01)
(52) U.S. Cl.
CPC ........................................ *G06F 1/08* (2013.01)
(58) Field of Classification Search
CPC ................................ H04L 7/00; H04L 7/0008
USPC ..................................... 375/356; 370/338, 350
See application file for complete search history.

(56) References Cited

U.S. PATENT DOCUMENTS

2010/0297975 A1* 11/2010 Carrera et al. ................ 455/307

* cited by examiner

*Primary Examiner* — Kevin Kim
(74) *Attorney, Agent, or Firm* — Winston Hsu; Scott Margo (57) ABSTRACT

A data transmission apparatus disposed within two network layers operative at different data rates is provided. The data transmission apparatus is coupled to a clock generator which provides a reference clock for a lower network layer and is coupled to a frequency synthesizer with an integer division factor that generates a divided clock for an upper network layer according to the reference clock and the integer division factor. The data transmission apparatus includes a first processing circuit and a second processing circuit. The first processing circuit corresponding to the upper network layer receives and transmits data by using the divided clock as its operation frequency. The second processing circuit corresponding to the lower network layer receives and transmits data from the first processing circuit by using the reference clock as an operation frequency for encoding data. The divided clock is generated from the frequency synthesizer with the integer division factor.

15 Claims, 8 Drawing Sheets

DATA TRANSMISSION APPARATUS HAVING FREQUENCY SYNTHESIZER WITH INTEGER DIVISION FACTOR, CORRESPONDING METHOD, AND DATA TRANSMISSION SYSTEM

BACKGROUND

Generally speaking, a conventional device disposed within two network layers operative at different data rates may employ a fractional clock divider to obtain and use a divided clock as an operation frequency of one of the network layers. However, employing the fractional clock divider must introduce significant circuit costs and also increase the difficulty of circuit design. Thus, it is important to provide a novel scheme to solve this problem.

SUMMARY

One of the objectives of the invention is to provide a data transmission system having a frequency synthesizer with an integer division factor, a data transmission apparatus, and a corresponding method, to solve the above-mentioned problem.

According to an embodiment of the invention, a data transmission apparatus disposed within two network layers which are operative at different data rates is disclosed. The data transmission apparatus is coupled to a clock generator which provides a reference clock for a lower network layer and is coupled to a frequency synthesizer with an integer division factor that generates a divided clock for an upper network layer according to the reference clock and the integer division factor. The data transmission apparatus comprises a first processing circuit and a second processing circuit. The first processing circuit corresponding to the upper network layer is coupled to the frequency synthesizer and utilized for receiving and transmitting data by using the divided clock as an operation frequency of the first processing circuit. The second processing circuit corresponding to the lower network layer is coupled to the clock generator and the first processing circuit and is used for receiving and transmitting data from the first processing circuit by using the reference clock as an operation frequency for encoding data within the second processing circuit. The divided clock is generated from the frequency synthesizer with the integer division factor.

According to an embodiment of the invention, a method used in a data transmission system disposed within two network layers which are operative at different data rates is disclosed. The method comprises: using a clock generator for providing a reference clock for a lower network layer; using a frequency synthesizer with an integer clock division to generate a divided clock for a upper network layer according to the reference clock and the integer clock division; receiving and transmitting data by using the divided clock as an operation frequency of a first processing circuit corresponding to the upper network layer; and receiving and transmitting data from the first processing circuit by using the reference clock as an operation frequency for encoding data within a second processing circuit corresponding to the lower network layer; wherein the divided clock is generated from the frequency synthesizer with the integer clock division.

According to an embodiment of the invention, a data transmission system corresponding to two network layers which are operative at different data rates is disclosed. The data transmission system comprises a clock generator, a frequency synthesizer with an integer division factor, a first processing circuit, and a second processing circuit. The clock generator is used for providing a reference clock for a lower network layer. The frequency synthesizer with the integer division factor is coupled to the clock generator and used for generating a divided clock for an upper network layer according to the reference clock and the integer division factor. The first processing circuit corresponding to the upper network layer is coupled to the frequency synthesizer and used for receiving and transmitting data by using the divided clock as an operation frequency of the first processing circuit. The second processing circuit corresponding to the lower network layer is coupled to the clock generator and the first processing circuit, and is used for receiving and transmitting data from the first processing circuit by using the reference clock as an operation frequency for encoding data within the second processing circuit. The divided clock is generated from the frequency synthesizer with the integer division factor.

In the above embodiments, a conventional fractional clock divider is replaced by the frequency synthesizer with the integer division factor, and thus the conventional fractional clock divider is not required. Circuit costs can be reduced significantly. In addition, data overflow and underflow can be avoided by adjusting the operation frequency of the first processing circuit at the upper network layer and by appropriately designing a ratio of clock enable cycles to clock disable cycle(s).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
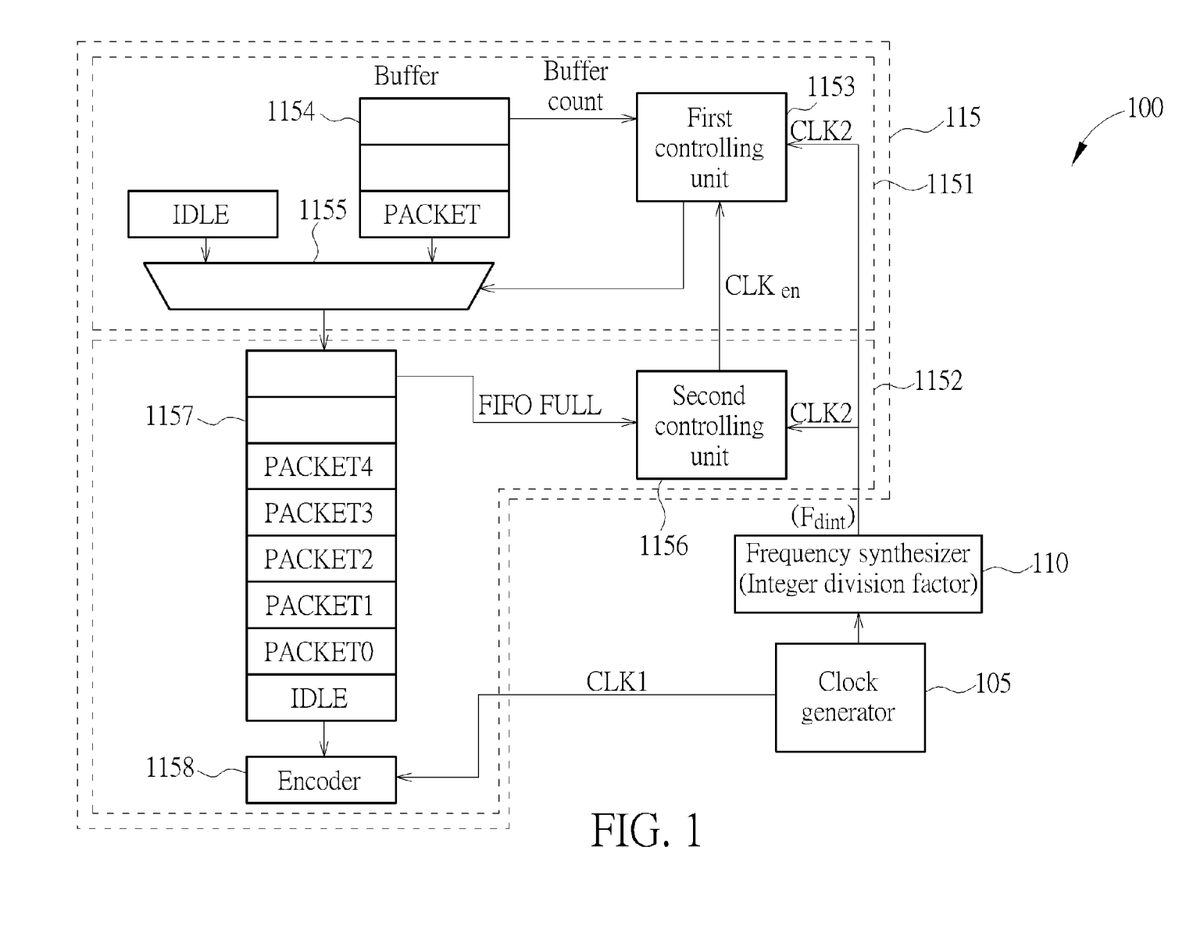
FIG. 1 is a diagram of a data transmission system according to an embodiment of the present invention.

Please refer to FIG. 1, which is a diagram of a data transmission system 100 according to an embodiment of the present invention. The data transmission system 100 comprises a clock generator 105, a frequency synthesizer 110, and a data transmission apparatus 115. The data transmission apparatus 115 comprises a first processing circuit 1151 and a second processing circuit 1152. The first processing circuit 1151 comprises a first controlling unit 1153, a first buffer 1154, and a multiplexer 1155. The second processing circuit 1152 comprises a second controlling unit 1156, a second buffer 1157, and an encoder 1158. The data transmission system 100 corresponds to two different network layers which are upper and lower network layers operative at different data rates. That is, the data transmission apparatus 115 is disposed within the two network layers which are operative at different data rates. The data transmission apparatus 115 is coupled to the clock generator 105 that provides a reference clock CLK1 for the lower network layer and coupled to the frequency synthesizer 110 with an integer division factor that generates a divided clock CLK2 for the upper network layer according to the reference clock CLK1 and the integer division factor.

Both the first processing circuit 1151 and the second processing circuit 1152 and encoder 1158 are utilized for processing data transmission and data reception by using corresponding operation frequencies, respectively. The operation frequencies come from an output of the frequency synthesizer 110 and an output of the clock generator 105. The first processing circuit 1151 corresponding to the upper network layer is used for receiving and transmitting data by using the divided clock CLK2 as its operation frequency. The second processing circuit 1152 corresponding to the lower network layer is used for receiving and transmitting data by using the divided clock CLK2 as its operation frequency. The encoder 1158 corresponding to the lower network layer is used for receiving and transmitting data by using the reference clock CLK1 as its operation frequency for encoding data. The clock generator 105 is arranged to generate the reference clock CLK1 and provide the reference clock CLK1 for the second processing circuit 1152 disposed within the lower network layer. The second processing circuit 1152 adopts the frequency of the reference clock CLK1 as an operation frequency to execute data encoding for processing data transmission and reception.

For example, if the lower network layer is a physical (PHY) layer and transmitted frames are 64B/66B encoded within PHY layer based on 10-Lane interface, the clock generator 105 generates the reference clock CLK1 having the frequency of 10.3125 GHz and the encoder 1158 adopts the frequency of 10.3125 GHz as its operation frequency for processing data transmission and reception. In addition, the clock generator 105 also provides the reference clock CLk1 for the frequency synthesizer 110, and the frequency synthesizer 110 with the integer division factor is arranged to generate the divided clock CLK2 according to the reference clock CLK1 and the integer division factor. The frequency synthesizer 110 with the integer division factor can be implemented by using an integer clock divider. The frequency synthesizer 110 provides the divided clock CLK2 for the first processing circuit 1151 disposed within the upper network layer. The first processing circuit 1151 adopts the frequency of the divided clock CLK2 as its operation frequency for processing data transmission and reception.

For example, if the upper network layer is a data link layer (i.e. medium access control (MAC) layer) and transmitted frames are 64B/66B encoded within PHY layer based on 10-Lane interface, the integer division factor is chosen as 18, and thus the frequency of divided clock CLK2 is at 572 MHz; the frequency of 10.3125 GHz divided by 18 is equal to 572 MHz. The first processing circuit 1151 adopts the frequency of 572 MHz as its operation frequency. It should be noted that PHY layer and MAC layer actually are specified to be operative at the different data rates of 10.3125 GHz and 521 MHz; MAC layer operative at data rate of 521 MHz is based on 10-Lane interface of PHY layer, 64B/66B encoding, and 192 bits transmitted from MAC layer to PHY layer per clock cycle. It is noted that 521 MHz is derived from 10.3125 GHz divided by 19.8 (66/64/10*192). The frequency of the reference clock CLK1 is substantially equal to the data rate at which PHY layer is operative, and the frequency of divided clock CLK2 is slightly higher than the data rate at which MAC layer is operative.

For a conventional scheme, a non-integer clock divider has to be employed for generating the frequency of 521 MHz based on the frequency of 10.3125 GHz. Circuit costs are introduced into the conventional scheme. However, in the present embodiment, an integer clock divider (i.e. the frequency synthesizer 110) is used to replace the non-integer clock divider in the conventional scheme for providing the slightly higher operation frequency for the first processing circuit 1151 disposed within MAC layer. The frequency of 572 MHz is provided by the integer clock divider. Thus, compared to the conventional scheme, circuit costs can be largely reduced since a non-integer clock divider is not required. The slightly higher operation frequency for the first processing circuit 1151 is not meant to be a limitation of the invention. In addition, in another embodiment, the integer division factor can be an integer number larger than 18, and the operation frequency for the first processing circuit 1151 can be set as a frequency which is slightly lower than the data rate of 521 MHz. This also falls within the scope of the invention. In a preferred embodiment, the slightly higher operation frequency for the first processing circuit 1151 is selected.

In response to using the frequency of divided clock CLK2 as the operation frequency of first processing circuit 1151, the first processing circuit 1151 is arranged to adjust a rate of data outputted. Namely, the first processing circuit 1151 operates to avoid data inputting to the buffer 1154 when the buffer 1154 is full (i.e. avoiding overflow) and to avoid data outputting from the buffer 1154 when the buffer 1154 is empty (i.e. avoiding underflow). Specifically, the first processing circuit 1151 adjust the rate of data outputting according to a signal notified by the second processing circuit 1152, and the operation of adjusting the rate of data outputting can be achieved by selectively activating data processing/outputting of first processing circuit 1151 and selectively deactivating the data processing/outputting.

It should be noted that the data processing/outputting of first processing circuit 1151 at least comprises data reception, data processing, and data transmission. In the following description, selectively activating and deactivating data processing/outputting is based on the data transmission; however, this can be also applied for data reception and data processing. The adjusting for the rate of the data processing/outputting is performed by enabling the data processing/outputting of first processing circuit 1151 at the slightly higher operation frequency (i.e. CLK2) during a first time period EL and disabling the data processing/outputting during a second time period DL. More specifically, the first processing circuit 1151 can disable a reception of the divided clock CLK2 for the second time period DL to avoid operating at these corresponding cycles of the divided clock CLK2 (i.e. cycles 9, 10, and 11 of CLK2). Thus, it can prevents that the exist data in the buffer 1154 being overwritten by input data.

In addition, the timings for enabling and disabling the data processing/outputting of first processing circuit 1151 can be controlled by the second processing circuit 1152 within PHY layer. The second processing circuit 1152 is arranged to send a notification to the first processing circuit 1151 to dynamically notify the first processing circuit 1151 of when to enable the data processing/outputting and when to disable the data processing/outputting. In practice, the notification is implemented by using a clock enable signal $CLK_{en}$ that defines the first time period EL and the second time period DL mentioned above. If the second processing circuit 1152 notifies the first processing circuit 1151 of starting to enable the data processing/outputting, the first processing circuit 1151 activates the data processing/outputting by using the frequency of CLK2 as its operation frequency. Instead, if the second processing circuit 1152 notifies the first processing circuit 1151 of starting to disable the data processing/outputting, the first processing circuit 1151 temporarily stops or deactivates the data processing/outputting.

Within the second processing circuit 1152, the second buffer 1157 is arranged to receive and buffer data transmitted from the first processing circuit 1151 within MAC layer. The second buffer 1157 can be implemented by using a first-in-first-out (FIFO) buffer; however, this is not meant to be a limitation of the invention. Data (i.e. packets) temporarily stored within the second buffer 1157 is transmitted to the encoder 1158 in sequence, and after data encoding the encoder 1158 transmits encoded data to the transport medium, i.e. Ethernet. A detection scheme is employed for detecting whether the second buffer 1157 is full or not. The detection scheme may be implemented within the second buffer 1157 or may be executed by the second controlling unit 1156. For example, the second buffer 1157 may be arranged to detect whether the second buffer 1157 is full or not by itself, and/or in another embodiment the second controlling unit 1156 may be arranged to detect whether the second buffer 1157 is full. In addition, the detection scheme may be employed within both the second buffer 1157 and second controlling unit 1156. When detecting that the second buffer 1157 is full, the second controlling unit 1156 is arranged to notify the first controlling unit 1153 of starting to disable the data processing/outputting.

When receiving this notification indicating the second buffer 1157 is full, the first controlling unit 1153 is arranged to control the multiplexer 1155 and the first buffer 1154 to temporarily stop the data processing/outputting, i.e. temporarily stopping data transmission from the first buffer 1154 to the second buffer 1157. Thus, the data processing/outputting of the first processing circuit 1151 is temporarily deactivated. Specifically, in this situation, the multiplexer 1155 keeps the output data of the last activated cycle without inputting to the first buffer 1154. That is, by temporarily deactivating data transmission/output of the data within the first buffer 1154, this can avoid data overflow of the second buffer 1157.

Afterwards, the above-mentioned detection scheme may detect that the second buffer 1157 is not full, and the second controlling unit 1156 accordingly notifies the first controlling unit 1153 of starting to enable the data processing/outputting. The controlling circuit 1153 controls the multiplexer 1155 to select data of the first buffer 1154 as its data source, and then data buffered within the first buffer 1154 can be outputted to the second processing circuit 1152 via the multiplexer 1155. The operation of the data processing/outputting of first processing circuit 1151 within MAC layer is activated/enabled again.

Further, in order to avoid data underflow of the second buffer 1157, a ratio of the first time period EL (for enabling the data processing/outputting) to the second time period DL (for disabling data processing/outputting) is appropriately designed in this embodiment. To avoid data underflow, a ratio of the first time period EL to a time period of EL plus DL is designed to be at least higher than a ratio of the frequency at which MAC layer is operative to the operation frequency of the first processing circuit 1151. The relation is described as below:

$$EL/(EL+DL) > F_d/F_{dint}$$

EL indicates the first time period, i.e. time cycles with data processing/outputting. DL indicates the second time period, i.e. time cycle(s) without data processing/outputting. $F_d$ indicates the frequency at which MAC layer is operative. $F_{dint}$ indicates the operation frequency of the first processing circuit 1151, i.e. the frequency of divided clock CLK2. The first time period EL and second time period DL can be appropriately determined according to the above-mentioned relation.

In other embodiments, the first processing circuit 1151 may be arranged to periodically enable and disable data processing/outputting for the first buffer 1154, i.e. to periodically enable/disable data transmission and reception of the first processing circuit 1151. Please refer to FIG. 2, which is a diagram illustrating different examples for implementing the first time period EL and second time period DL. Assuming that the ratio of the first time period EL to the second time period DL is configured as a ratio of three to one, however, this example is merely used for explanation but not meant to be a limitation.

Figure 2:
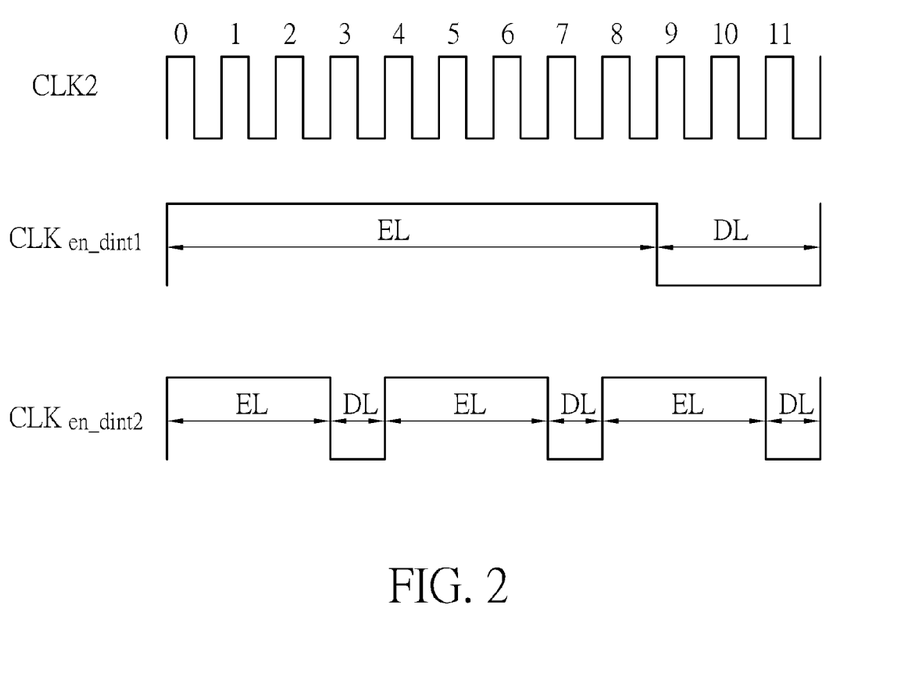
FIG. 2 is a diagram illustrating different examples for implementing the first time period EL and second time period DL.

In FIG. 2, the divided clock CLK2 is represented by a square wave with a 50% duty cycle. $CLK_{en\_dint1}$ indicates a first example of the clock enable signal, and $CLK_{en\_dint2}$ indicates a second example of the clock enable signal. The second controlling unit 1156 of the second processing circuit 1152 notifies the first processing circuit 1151 of enabling the data processing/outputting at the rising edges of the clock enable signal ($CLK_{en\_dint1}$ or $CLK_{en\_dint2}$) by maintaining the level of the clock enable signal ($CLK_{en\_dint1}$ or $CLK_{en\_dint2}$) at a high logic level, and notifies the first processing circuit 1151 of disabling the data processing/outputting at the falling edges of the clock enable signal ($CLK_{en\_dint1}$ or $CLK_{en\_dint2}$) by maintaining the level at a low logic level. The first controlling unit 1153 of the first processing circuit 1151 controls the multiplexer 1155 to selectively performing data outputting based on a notification from the second processing circuit 1152.

For the case of $CLK_{en\_dint1}$, the first time period EL is designed as nine consecutive clock cycles (i.e. Cycle 0-Cycle 8), and the second time period DL is designed as three consecutive clock cycles following the first time period EL (i.e. Cycle 9-Cycle 11). The first time period EL with nine consecutive clock cycles indicates writing a burst of consecutive data. The first processing circuit 1151 writes the burst of consecutive data into the second processing circuit 1152 during Cycle 0-Cycle 8 and then stop writing data during Cycle 9-Cycle 11. Once Cycle 11 is ended, the first processing circuit 1151 continues to write a burst of consecutive data into the second processing circuit 1152 during next nine consecutive clock cycles. In other words, the first processing circuit 1151 periodically enables the data processing/outputting by nine clock cycles and disables the data processing/outputting by three clock cycles during each twelve clock cycles.

Additionally, in another example, for the case of $CLK_{en\_dint2}$ the first time period EL is designed as three consecutive clock cycles such as Cycle 0-Cycle 2, and the second time period DL is designed as single one clock cycle such as Cycle 3. The first processing circuit 1151 writes data into the second processing circuit 1152 during Cycle 0-Cycle 2, and then stops writing data during only one clock cycle such as Cycle 3. Once Cycle 3 is ended, the first processing circuit 1151 writes data into the second processing circuit 1152 during next three clock cycles. In other words, the first processing circuit 1151 periodically enables the data processing/outputting by three consecutive clock cycles and disables the data processing/outputting by only one clock cycle during each four clock cycles.

For the case of $CLK_{en\_dint2}$, the second buffer 1157 can be implemented by a smaller size of buffer. In addition, since one cycle of the divided clock CLK2 is regarded as the minimum unit time, equivalently each time the first processing circuit 1151 is arranged to disable the data outputting by one minimum unit time. In addition, determining whether to enable/disable the data processing/outputting can be performed based on both the operations for detecting whether the second buffer 1157 is full and for periodically enabling/disabling the data processing/outputting. That is, the second processing circuit 1152 can periodically notify the first processing circuit 1151 of enabling/disabling the data processing/outputting and can also immediately notify the first processing circuit 1151 of disabling the data processing/outputting once the buffer 1157 is full or about to be full.

Figure 3:
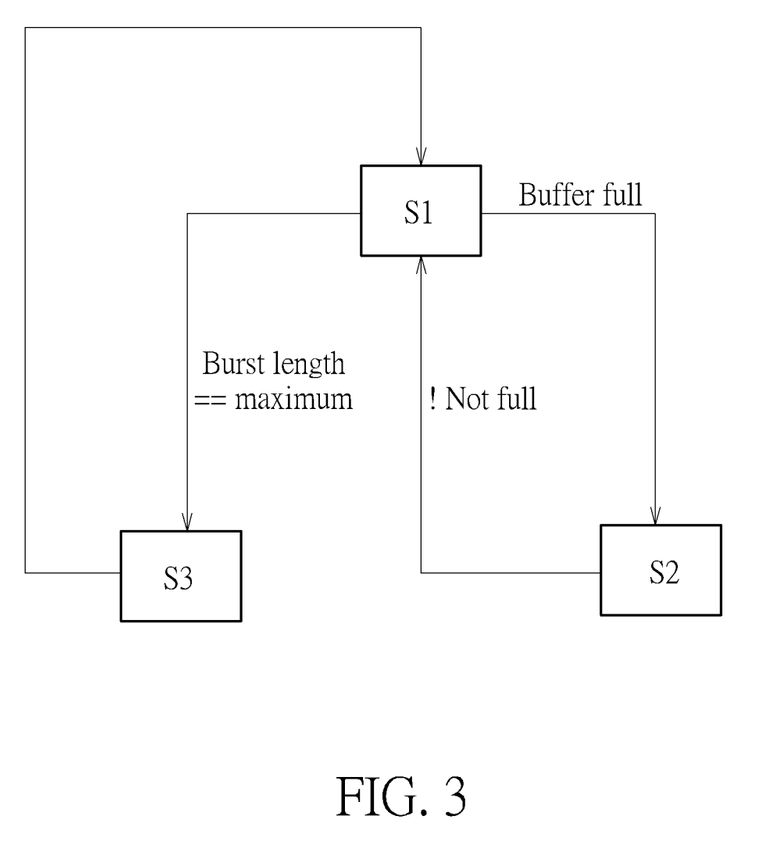
FIG. 3 is a state diagram of the second processing circuit of FIG. 1 for sending the clock enable signal $CLK_{en}$ to enable/disable the data processing/outputting of the first processing circuit.

FIG. 3 illustrates a state diagram of the second processing circuit 1152 for sending the clock enable signal $CLK_{en}$ to enable/disable the data processing/outputting of the first processing circuit 1151. As shown in FIG. 3, the operation of the second processing circuit 1152 can be represented by three states of S1, S2, and S3. Assuming that the ratio of the first time period (i.e. EL cycles) to the second time period (i.e. DL cycles) is equal to the ratio of three to one, the second processing circuit 1152 is arranged to send the clock enable signal $CLK_{en}$ with a period of four cycles in which one DL cycle follows three EL cycles. In the state of S1, the second processing circuit 1152 maintains the clock enable signal $CLK_{en}$ at the high logic level for three consecutive clock cycles, to notify the first processing circuit 1151 of enabling the data processing/outputting. The second processing circuit 1151 then receives a burst length of data, i.e. three consecutive data units (packets), from the first processing circuit 1151. The second processing circuit 1151 may configure a counter to count the burst length of data from zero to three (i.e. the length of burst data). When the counter has counted to the maximum value of burst length, this indicates that the second processing circuit 1151 has received these consecutive data units, and the second processing circuit 1152 exits from the state of S1 and enters the state of S3. In the state of S3, the second processing circuit 1152 maintains the clock enable signal $CLK_{en}$ at the low logic level for one clock cycle, to notify the first processing circuit 1151 of disabling the data processing/outputting. The first processing circuit 1151 then stops transmitting data to the second processing circuit 1151 for one clock cycle, and the counter of second processing circuit 1152 for counting the burst length of data is reset to zero. After one clock cycle (i.e. the DL cycle), the second processing circuit 1152 exits from the state of S3 and enters the state of S1 again.

Additionally, once the second buffer 1157 of the second processing circuit 1152 is full or about to be full in the state of S1, the second processing circuit 1152 is arranged to exit the state of S1 and enter the state of S2. In the state of S2, the second processing circuit 1152 maintains the clock enable signal $CLK_{en}$ at the low logic level for at least one clock cycle(s), to cause the first processing circuit 1151 disable the data processing/outputting for at least one clock cycle(s). The counter of second processing circuit 1152 for counting the burst length of data is reset to zero. After at least one clock cycle (s), if detecting that the second buffer 1157 is not full, the second processing circuit 1152 exits from the state of S3 and enters the state of S1 again. The clock enable signal $CLK_{en}$ is de-asserted when the buffer 1157 is full or the maximum value of burst length writing is reached.

In this embodiment, a low-watermark is designed and provided for the first buffer 1154 to avoid data underflow within MAC layer. Specifically, the low-watermark is used for checking data amount resided within the first buffer 1154 before the first processing circuit 1151 starts to transmit a new frame/packet to the second processing circuit 1152 so as to avoid data underflow of the first buffer 1154. The low-watermark is regarded as a threshold and data can be read out from the first buffer 1154 only when the resided data amount is higher the threshold specified by the low-watermark.

Thus, the above-mentioned operation for periodically enabling/disabling the data processing/outputting gains some advantages as described below. This can effectively reduce a size of the low-watermark for the first buffer 1154 within the first processing circuit 1151 within MAC layer. This is because a data rate for writing data into the first buffer 1154 may be configured to match the data rate which MAC layer is originally operative to, and this data rate for writing data may be slightly lower than the frequency of the divided clock CLK2, i.e. the rate for data processing/outputting. The throughput of reading data from the first buffer 1154 may be higher than the throughput of writing data into the first buffer 1154.

That is, the first processing circuit 1151 can enable its data transmission for transmitting data of a new frame/packet from the first buffer 1154 to the second processing circuit 1152 only when detecting that data of the first buffer 1154 exceeds above the threshold. If the resided data amount in the first buffer 1154 is lower than the threshold specified by the low-watermark, the multiplexer 1155 selects the "IDLE" as its output and does not select data of the first buffer 1154 as its data source. Thus, the multiplexer 1155 is in an idle state, and data within the first buffer 1154 is not transmitted to the second processing circuit 1152 via the multiplexer 1155. The value of low-watermark can be designed to be minimized. One way is to distribute the cycles of the second time period DL as shown by the case of $CLK_{en\_dint2}$ in FIG. 2. That is, the value of low-watermark can be minimized by evenly distributing DL cycles. When the value of low-watermark is minimized, circuit costs of the first processing circuit 1151 within MAC layer can be correspondingly reduced.

Figure 4A:
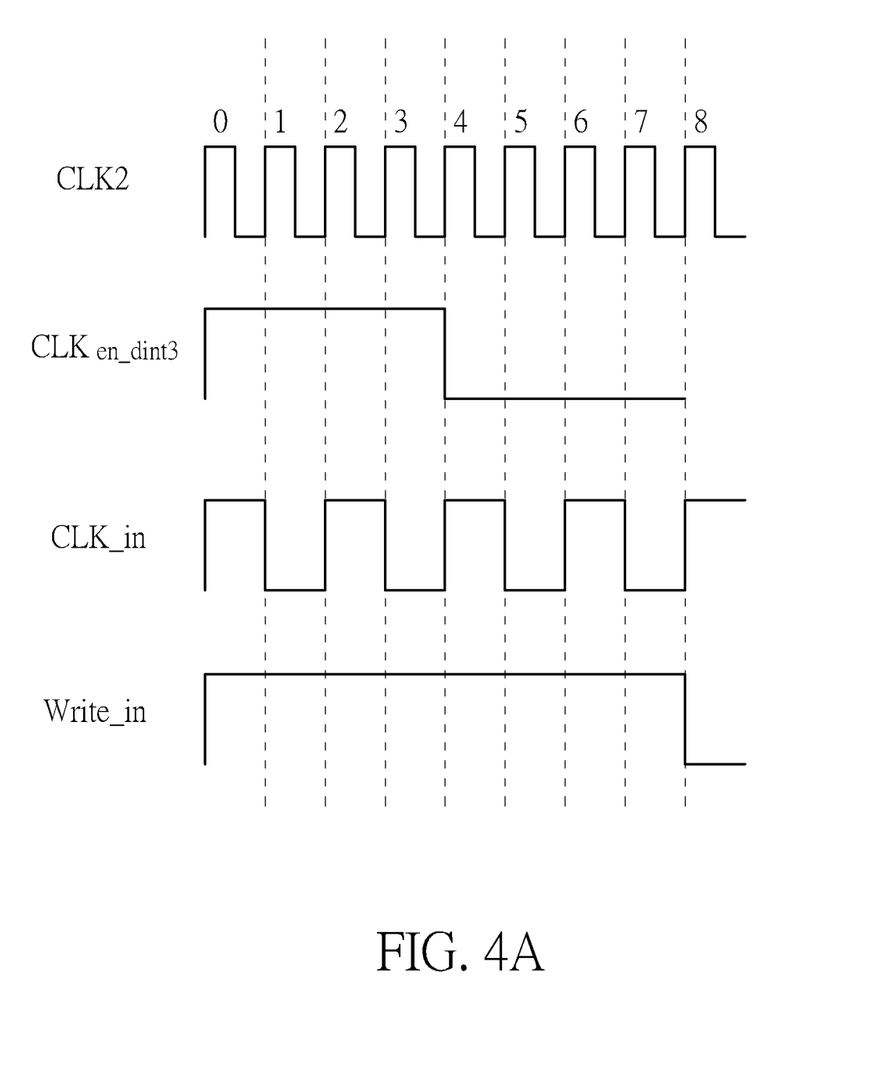
FIG. 4A is a simplified diagram illustrating a first example of the low-watermark.
Figure 4B:
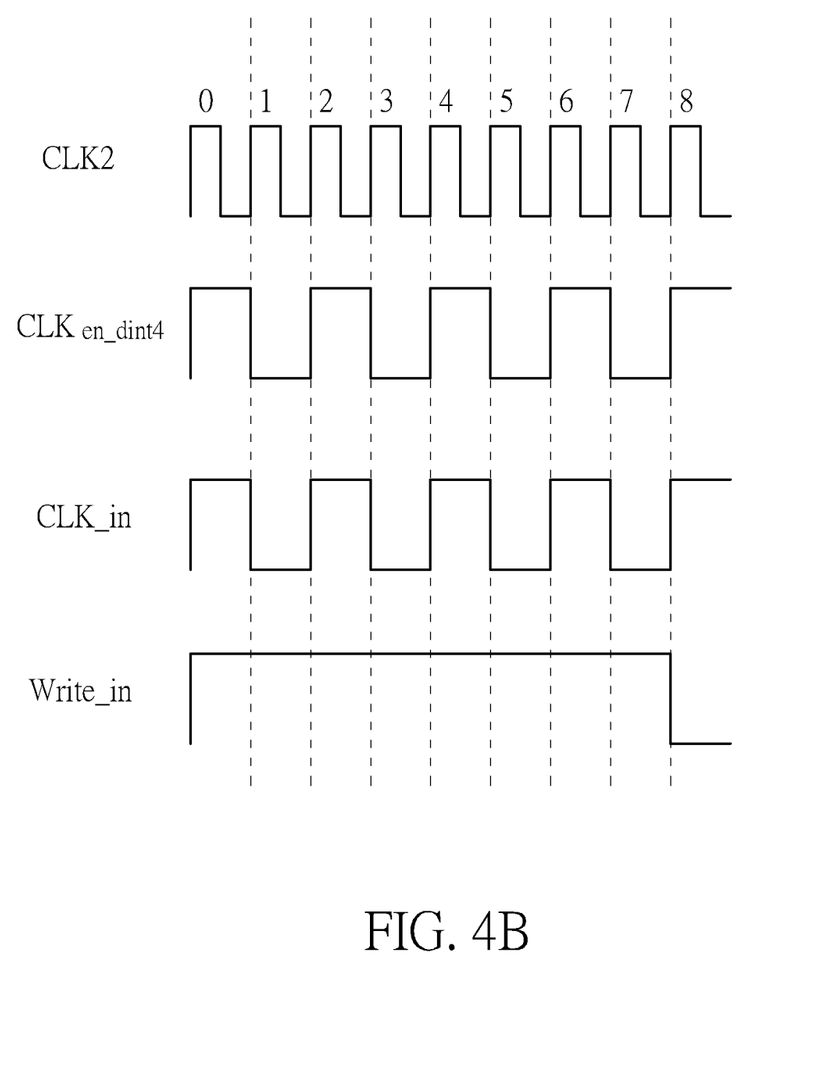
FIG. 4B is a simplified diagram illustrating a second example of the low-watermark.

Please refer to FIG. 4A in conjunction with FIG. 4B. FIG. 4A is a simplified diagram illustrating a first example of the low-watermark mentioned above, and FIG. 4B is a simplified diagram illustrating a second example of the low-watermark mentioned above. Assuming that the ratio of the first time period EL to the second time period DL is configured as a ratio of one to one and that the frequency of the divided clock CLK2 is twice of the data rate for writing data into the first buffer 1154, however, this example is merely used for explanation and not meant to be a limitation. In addition, in order to simplify the description for the operations about EL and DL, it is assumed that one data unit is read from or written into the first buffer 1154 during one clock cycle. As shown in FIG. 4A, $CLK_{en\_dint3}$ indicates that the clock enable signal described above is with four EL cycles and four DL cycles during each eight clock cycles. Write_in being maintained at a high logical level indicates that data is being written into the first buffer 1154 at the frequency of CLKin. In this example, the value of the low-watermark is designed as two. The clock-enable $CLK_{en\_dint3}$ is de-asserted consecutively at cycle 4-cycle 7. That is, the first controlling unit 1153 controls the multiplexer 1155 not to select data of the first buffer 1154 as its output source until the resided data amount in the first buffer 1154 is equal to two data units or exceeds two data units.

In the second example of $CLK_{en\_dint4}$/$CLK_{en\_dint4}$ indicates that the clock enable signal described above is with one EL cycle and one DL cycle during each two clock cycles. Write_in being maintained at a high logical level indicates that data is being written into the first buffer 1154 at the frequency of CLK_in, which is twice of the frequency of divided clock CLK2. The value of the low-watermark in this example is designed as one. The cycles with clock-enable $CLK_{en\_dint4}$ de-asserted are distributed evenly at cycle 1, 3, 5, 7. That is, the first controlling unit 1153 controls the multiplexer 1155 not to select the first buffer 1154 as its output source until the resided data amount in the first buffer 1154 is equal to one data unit or exceeds one data unit. $CLK_{en\_dint3}$ and $CLK_{en\_dint4}$ both correspond to the same ratio of the first time period EL to the second time period DL, i.e. the ratio of one to one.

A difference is that in the case of $CLK_{en\_dint3}$ the first processing circuit is arranged to write a burst of consecutive data units into the second processing circuit 1152 during the first time period EL (i.e. EL cycles) while the first processing circuit is not arranged to write a burst of data into the second processing circuit 1152 during the first time period EL in the different case of $CLK_{en\_dint4}$. Accordingly, the value of low-watermark in the case of $CLK_{en\_dint4}$ can be minimized to one. In addition, in another embodiment, if the data amount resided in the first buffer 1154 does not exceed a threshold specified by the low-watermark, then data resided within the buffer 1154 would not be transmitted to the second processing circuit 1152 within PHY layer, and instead idle characters or idle frames may be transmitted to the second processing circuit 1152 within PHY layer. This also falls with the scope of the invention. In addition, the value of low-watermark may be designed based on the difference of the throughput of data writing and throughput of data reading for the first buffer 1154. For example, the value of low-watermark can be designed as the difference between the throughputs mentioned above.

Figure 5:
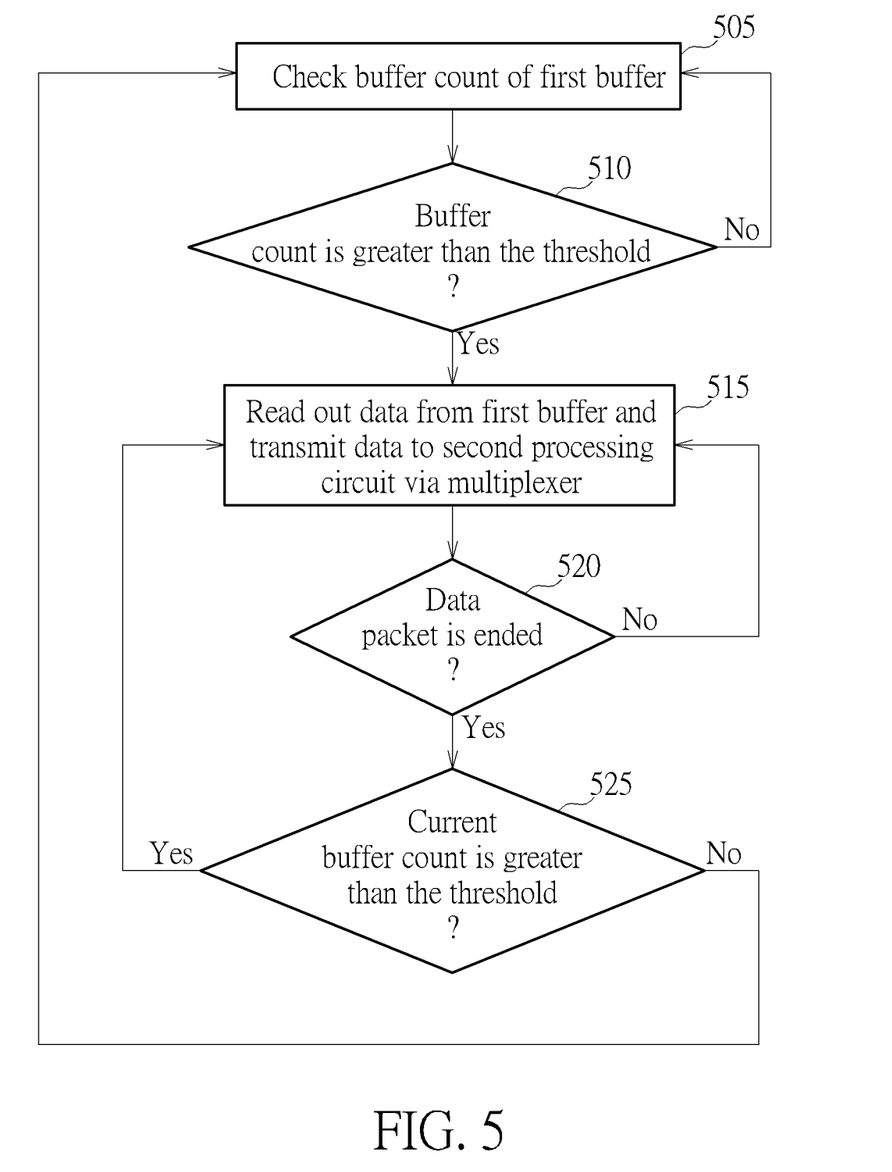
FIG. 5 is a diagram illustrating a flowchart regarding the operations of the first processing circuit as shown in FIG. 1.

Please refer to FIG. 5, which is a diagram illustrating a flowchart regarding the operations of the first processing circuit 1151 within MAC layer as shown in FIG. 1. Provided that substantially the same result is achieved, the steps of the flowchart shown in FIG. 5 need not be in the exact order shown and need not be contiguous, that is, other steps can be intermediate.

In Step 505, the first controlling unit 1153 checks a buffer count of the first buffer 1154. The buffer count indicates a data amount being currently resided in the first buffer 1154. Specifically, the first controlling unit 1153 obtains the buffer count from the first buffer 1154. In Step 510, the first controlling unit 1153 compares the buffer count with the threshold specified by the low-watermark to check whether the buffer count is greater than the threshold or not. If the buffer count is not greater than the threshold, this indicates stopping data outputting of a new packet/frame from the first buffer 1154 to avoid data underflow, and the flow goes back to Step 505. If the buffer count is greater than the threshold, the flow goes to Step 515. In Step 515, the data is read out from the first buffer 1154 and transmitted to the second processing circuit 1152 via the multiplexer 1155, and the flow goes to Step 520. In Step 520, the first controlling unit 1153 checks if a data packet is ended or not. If a data packet is not ended, the flow goes back to Step 515. If the data packet is ended, the flow goes to Step 525. In Step 525, the first controlling unit 1153 checks whether a current buffer count is greater than the threshold or not. If the current buffer count is not greater than the threshold, the flow goes to Step 505. If the current buffer count is greater than the threshold, the flow goes to Step 515. That is, in this embodiment, before reading a new data packet out from the first buffer 1154, the first controlling unit 1153 is arranged to check whether a buffer count indicating a data amount currently resided in the first buffer 1154 is greater than the threshold specified by the low-watermark, to avoid data underflow.

In this embodiment, the value of the low-watermark can be designed by using either a positive integer without a fractional component or a positive non-integer with an integer component and a fractional component. The value of the low-watermark may be designed as the positive non-integer when a data width for writing data into the first buffer 1154 is a multiple of a data width for reading out from the first buffer 1154. That is, a rate of data reception for MAC layer is multiple of a rate of data transmission for MAC layer. For example, assuming that the data width for writing data into the first buffer 1154 is equal to $W_{in}$ that is a multiple of $W_{out}$ such as $M \times W_{out}$, the granularity of the low-watermark can be designed as 1/M. Specifically, the first controlling unit 1153 is arranged to generate a buffer count by detecting whether a data unit (e.g. a packet) is written into the first buffer 1154, and the buffer count's incrementing represents that one data unit has been written into the first buffer 1154. The first controlling unit 1153 further utilizes a cycle counter to count the cycles of the divided clock CLK2 from zero to the value/ number M repeatedly, and resets the cycle counter to zero once detecting that the buffer count increments. Thus, once one data unit is written into the first buffer 1154, the buffer count increments by one, and the cycle counter is started from zero. When the cycle counter counts to one and the value of buffer count does not change, the first controlling unit 1153 determines that data resided in the first buffer 1154 has exceeded the threshold represented by the low-watermark. Then, the controlling unit 1135 controls the multiplexer 1155 to read out data from the first buffer 1154, and the buffer count is decreased by one.

The value of M is designed as (but not limited to) eight for illustrative purposes. Please refer to FIG. 6, which illustrates an example of the data width $W_{in}$ is being an octuple of $W_{out}$, i.e. 8×Wout. In this example, the value of low-watermark is designed (but not limited to) as 0.8. CLK2 indicates clock cycles of the divided clock CLK2. The high logic level of BUF_we indicates writing one data unit into the first buffer 1154 when BUF_we is at high logic level, and its low logic level indicates that no data is written into the first buffer 1154 when BUF_we is at low logic level. The number of BUF_cnt represents the number of data unit(s) resided in the first buffer 1154. The number of Cycle_cnt represents a number being counted by the cycle counter mentioned above. The high logic level of BUF_low_th indicates that data resided in the first buffer 1154 exceeds the threshold specified by the low-watermark, and instead its low logic level indicates that data does not exceed the threshold. The high logic level of BUF_rd indicates reading out one data unit from the first buffer 1154 when BUF_rd is at high logic level, and its low logic level indicates that no data is read out from the first buffer 1154 when BUF_rd is at low logic level.

Figure 6:
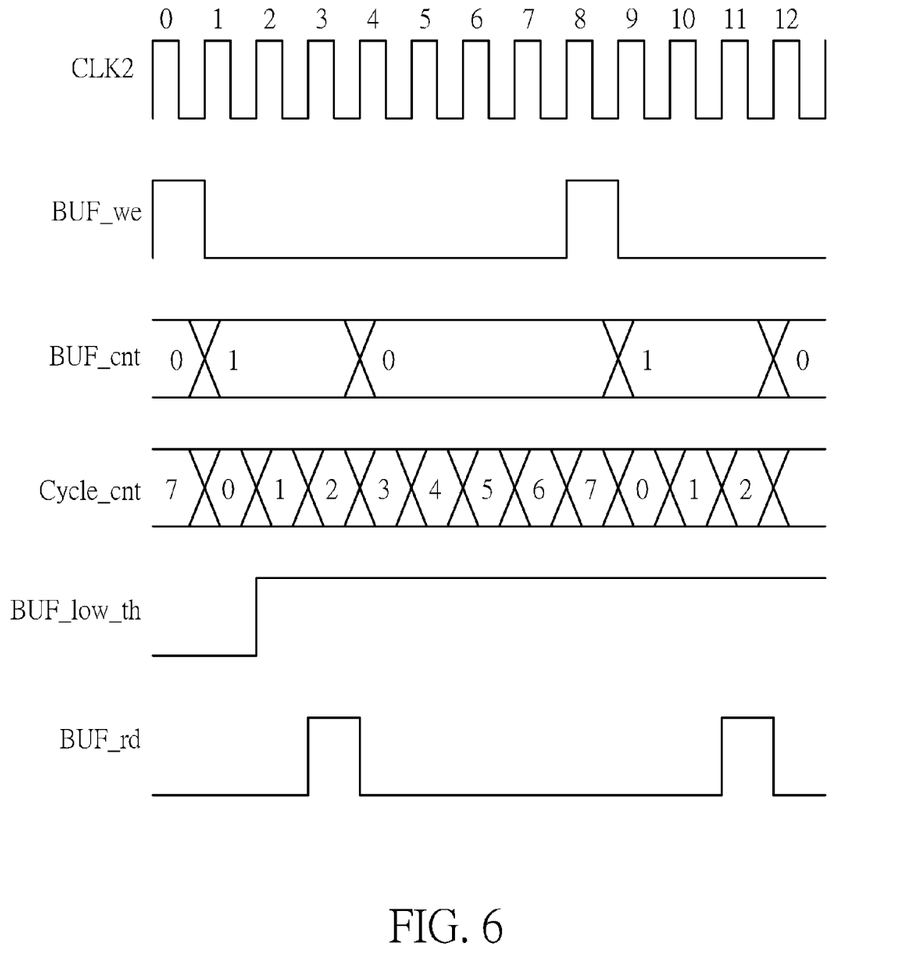
FIG. 6 is a diagram illustrating an example of the data width $W_{in}$ being an octuple of $W_{out}$, i.e. $8 \times W_{out}$.

As shown in FIG. 6, at Cycle 0, one data unit such as a packet is written into the first buffer 1154. At Cycle 1, the buffer count BUF_cnt is immediately increased from zero to one, and the cycle counter Cycle_cnt is reset and started. At Cycle 2, the buffer count BUF_cnt is still unchanged, and the cycle counter Cycle_cnt has counted to one from zero since the clock enable signal is asserted and the cycle counter Cycle_cnt starts. This represents that the data resided in the first buffer 1154 exceeds the threshold specified by the low-watermark. BUF_low_th is asserted to indicate that data resided in the first buffer 1154 exceeds the threshold specified by the low-watermark. Thus, at Cycle 3, one data unit is read out from the first buffer 1154, and the buffer count BUF_cnt is decreased by one at Cycle 4. Accordingly, by configuring the granularity of the low-watermark as 1/M such as ⅛, this can simultaneously achieve avoiding data underflow and reading out data from the first buffer 1154 in advance.

Figure 7:
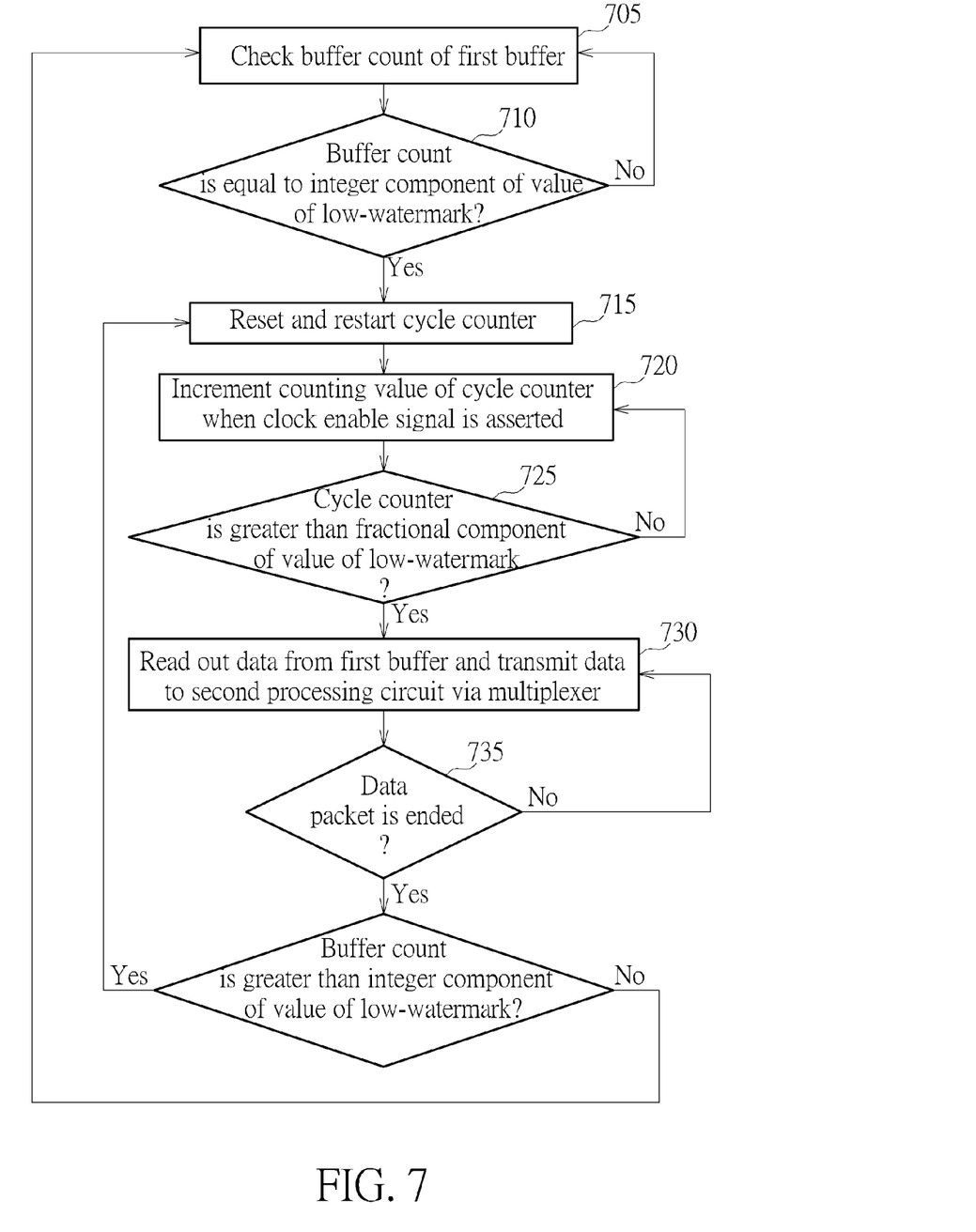
FIG. 7 is a diagram illustrating a flowchart regarding the operations of the first processing circuit as shown in FIG. 1 in conjunction with FIG. 6.

Please refer to FIG. 7, which is a diagram illustrating a flowchart regarding the operations of the first processing circuit 1151 within MAC layer as shown in FIG. 1 in conjunction with FIG. 6. Provided that substantially the same result is achieved, the steps of the flowchart shown in FIG. 7 need not be in the exact order shown and need not be contiguous, that is, other steps can be intermediate.

In Step 705, the first controlling unit 1153 checks a buffer count of the first buffer 1154. The buffer count indicates a data amount being currently resided in the first buffer 1154. If the buffer count is increased by one, this represents that one data unit is written into the first buffer 1154. Specifically, the first controlling unit 1153 obtains the buffer count from the first buffer 1154. In Step 710, the first controlling unit 1153 checks whether the buffer count is increased by one or not. If the buffer count is unchanged, then the flow goes back to Step 705, and instead if the buffer count is changed, the flow goes to Step 715. In practice, in Step 710, the first controlling unit 1153 may compare the buffer count with an integer component of the value of low-watermark to decide whether the buffer count is changed. In this embodiment, the value of low-watermark is designed as 1/M such as ⅛ that is equal to the value of 0.125. That is, the integer component is zero. By comparing the buffer count with the value of zero, the first controlling unit 1153 can decide if the buffer count is changed from zero to one. In Step 715, the first controlling unit 1153 resets and restarts the cycle counter mentioned above. In Step 720, the counting value of the cycle counter is incremented from zero to M−1 when the first controlling unit 1153 receives the clock enabling signal with a high logic level that indicates enabling data processing/outputting of the first processing circuit 1151. In Step 725, the first controlling unit 1153 compares the cycle counter with a fractional component of the value of low-watermark to determine whether to readout data from the first buffer 1154.

If the cycle counter is not greater than the fractional component, the flow goes back to Step 720. Instead, if the cycle counter is greater than the fractional component, the flow goes to Step 730. In Step 730, the data is read out from the first buffer 1154 and transmitted to the second processing circuit 1152 via the multiplexer 1155, and the flow goes to Step 735. In Step 735, the first controlling unit 1153 checks if a data packet is ended. If a data packet is not ended, the flow goes back to Step 730. If the data packet is ended, the flow goes to Step 740. In Step 740, the first controlling unit 1153 checks whether the buffer count is greater than the integer component of the value of the low-watermark or not. If the buffer count is not greater than the integer component, the flow goes to Step 705. If the buffer count is greater than the integer component, the flow goes to Step 710.

Further, the clock enable signal $CLK_{en}$ can be implemented by a trigger signal generated from the second controlling unit 1156 to the first controlling unit 1153. That is, in another embodiment, the clock enable signal $CLK_{en}$ may be generated only when the second controlling unit 1156 sends a notification to the first controlling unit 1153. The first processing circuit 1151 dynamically enables/disables data transmission and reception of the first processing circuit 1151 according to the trigger signal for adjusting the rate of data outputted by the first processing circuit 1151. More specifically, the first processing circuit 1151 can disable a reception of the divided clock CLK2 for the second time period DL to avoid using the divided clock CLK2 as its operation frequency when receiving a trigger signal sent from the second processing circuit 1152, and can enable the reception of the divided clock CLK2 after the second time period DL has elapsed. The second processing circuit 1152 can send the trigger signal to the first processing circuit 1151 in response to an event that the second buffer 1157 is full. This modification also falls within the scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data transmission apparatus disposed within two network layers which are operative at different data rates, the data transmission apparatus coupled to a clock generator which provides a reference clock for a lower network layer and coupled to a frequency synthesizer with an integer division factor that generates a divided clock for a upper network layer according to the reference clock and the integer division factor, and the data transmission apparatus comprises:

a first processing circuit corresponding to the upper network layer, coupled to the frequency synthesizer, for receiving and transmitting data by using the divided clock as an operation frequency of the first processing circuit; and a second processing circuit corresponding to the lower network layer, coupled to the clock generator and the first processing circuit, for receiving and transmitting data from the first processing circuit by using the reference clock as an operation frequency for encoding data within the second processing circuit;

wherein the divided clock is generated from the frequency synthesizer with the integer division factor, and a frequency of the divided clock is higher than a data rate at which the upper network layer is operative; the first processing circuit is arranged to adjust a rate of data outputted by the first processing circuit according to a signal notified by the second processing circuit, to avoid data overflow or underflow.

2. The data transmission apparatus of claim 1, wherein the signal notified by the second processing circuit is a trigger signal, and the first processing circuit is arranged to dynamically enable/disable data transmission and reception of the first processing circuit according to the trigger signal for adjusting the rate of data outputted by the first processing circuit.

3. The data transmission apparatus of claim 2, wherein the first processing circuit is arranged to disable a reception of the divided clock for a specific time period when receiving the trigger signal, and the first processing circuit is arranged to enable the reception of the divided clock after the specific time period has elapsed.

4. The data transmission apparatus of claim 2, wherein the second processing circuit includes a second buffer for storing data and is arranged to send the trigger signal to the first processing circuit in response to an event that the second buffer is full, and the first processing circuit is arranged to disable the data transmission and reception of the first processing circuit according to the trigger signal.

5. The data transmission apparatus of claim 2, wherein the first processing circuit includes a first buffer for storing data and is arranged to enable the data transmission of the first processing circuit only when detecting that data of the first buffer exceeds a specific threshold.

6. The data transmission apparatus of claim 2, wherein the first processing circuit is arranged to periodically enable/ disable the data transmission and reception of the first processing circuit according to the trigger signal.

7. The data transmission apparatus of claim 2, wherein a rate of data reception for the upper network layer is multiple of a rate of data transmission for the upper network layer; and, the first processing circuit includes a first buffer for storing data and is arranged to enable the data transmission of the first processing circuit when detecting that data of the first buffer exceeds a specific threshold.

8. A method used in a data transmission system disposed within two network layers which are operative at different data rates, comprising:

using a clock generator for providing a reference clock for a lower network layer;

using a frequency synthesizer with an integer clock division to generate a divided clock for an upper network layer according to the reference clock and the integer clock division, wherein the divided clock has a frequency higher than a data rate at which the upper network layer is operative;

receiving and transmitting data by using the divided clock as an operation frequency of a first processing circuit corresponding to the upper network layer;

receiving and transmitting data from the first processing circuit by using the reference clock as an operation frequency for encoding data within a second processing circuit corresponding to the lower network layer; and selectively adjusting a rate of data outputted by the first processing circuit according to a signal notified by the second processing circuit, to avoid data overflow or underflow;

wherein the divided clock is generated from the frequency synthesizer with the integer clock division.

9. The method of claim 8, wherein the signal notified by the second processing circuit is a trigger signal, and the step of selectively adjusting the rate of data outputted by the first processing circuit comprises:

dynamically enabling/disabling data transmission and reception of the first processing circuit according to the trigger signal.

10. The method of claim 9, wherein the step of dynamically enabling/disabling the data transmission and reception comprises:

disabling a reception of the divided clock for a specific time period when the trigger signal is received by the first processing circuit; and enabling the reception of the divided clock after the specific time period has elapsed.

11. The method of claim 9, wherein the second processing circuit includes a second buffer for storing data, and the method further comprises:

sending the trigger signal from the second processing circuit to the first processing circuit in response to an event that the second buffer is full; and disabling the data transmission and reception of the first processing circuit according to the trigger signal.

12. The method of claim 9, wherein the first processing circuit includes a first buffer for storing data, and the method further comprises:

enabling the data transmission of the first processing circuit when detecting that data of the first buffer exceeds a specific threshold.

13. The method of claim 9, wherein the step of dynamically enabling/disabling data transmission and reception of the first processing circuit comprises:

periodically enabling/disabling the data transmission and reception of the first processing circuit according to the trigger signal.

14. The method of claim 9, wherein a rate of data reception for the upper network layer is multiple of a rate of data transmission for the upper network layer, and the first processing circuit includes a first buffer for storing data; and, the method further comprises:

enabling the data transmission of the first processing circuit when detecting that data of the first buffer exceeds a specific threshold.

15. A data transmission system corresponding to two network layers which are operative at different data rates, comprising:

a clock generator, for providing a reference clock for a lower network layer;

a frequency synthesizer with an integer division factor, coupled to the clock generator, for generating a divided clock for an upper network layer according to the reference clock and the integer division factor;

a first processing circuit corresponding to the upper network layer, coupled to the frequency synthesizer, for receiving and transmitting data by using the divided clock as an operation frequency of the first processing circuit; and a second processing circuit corresponding to the lower network layer, coupled to the clock generator and the first processing circuit, for receiving and transmitting data from the first processing circuit by using the reference clock as an operation frequency for encoding data within the second processing circuit;

wherein the divided clock is generated from the frequency synthesizer with the integer division factor, and a frequency of the divided clock is higher than a data rate at which the upper network layer is operative; the first processing circuit is arranged to adjust a rate of data outputted by the first processing circuit according to a signal notified by the second processing circuit, to avoid data overflow or underflow.

* * * * *